United States Patent Office 3,271,432
Patented Sept. 6, 1966

3,271,432
PROCESS FOR THE MANUFACTURE OF POLY-
BASIC ARALIPHATIC CARBOXYLIC ACIDS
AND PRODUCTS THEREOF
Josef Baltes, Hamburg, Friedrich Weghorst and Zdzislaw
Makus, Hamburg-Harburg, Germany, assignors to Har-
burger Fettchemie Brinckman & Mergell G.m.b.H.,
Hamburg-Harburg, Germany, a corporation of Ger-
many
No Drawing. Filed Apr. 15, 1963, Ser. No. 272,873
Claims priority, application Germany, Apr. 25, 1962,
H 45,567
16 Claims. (Cl. 260—407)

This invention relates to the manufacture of polybasic araliphatic carboxylic acids and of derivatives thereof by ionic copolymerisation of conjugated-unsaturated fatty acids and derivatives thereof with aromatic vinyl compounds, preferably with styrene and styrene homologues.

The copolymerisation of unsaturated fats, fatty acids and derivatives thereof with styrene and styrene homologues—generally referred to as "styrolisation"—is known and is used in numerous variants in the manufacture of fat products predominantly used as paints. As starting materials there may be used on the one hand drying and semi-drying oils as well as their fatty acids, and on the other hand styrene and styrene homologues, such as alpha-methylstyrene and vinyltoluene. The process can be performed in the absence or presence of catalysts such as peroxides, acids or Friedel-Crafts catalysts. The conditions under which the process is performed may be fairly widely varied, inter alia with regard to the temperature and duration of the reaction, the use of solvents and organic substances which, if desired, may remain in the reaction products, the time taken for the reaction and the concomitant use of structurally different copolymerisable substances. A detailed description of this large field with literature reference will be found in J. Schreiber, "Chemie and Technologie der kuenstlichen Harze," Stuttgart, 1961, volume 1, pages 532 to 553.

For the sake of brevity, whenever the context permits, references to unsaturated fatty acids will denote also their derivatives, and references to styrene its homologues.

Neither the mechanism of the copolymerisation nor the chemical structure of the copolymers have so far been completely elucidated, though numerous researches concerning this matter have been described. This is probably mainly because under the conditions used in the known processes non-uniform products are formed which are extremely difficult to analyse. This explains the fact that right up to the very recent past it has actually been doubtful whether any formation of a coploymer of styrene with unsaturated fatty acids takes place at all, and it has repeatedly been assumed that the resulting products are mixtures of oligomeric or polymeric styrene with the fatty acids concerned. This assumption has not been confirmed; in fact it may be taken as proven that the styrolisation of unsaturated fatty acids gives rise to genuine copolymers, whose formation is at present interpreted in terms of the following reactions:

(1) Normal diene synthesis of conjugated-unsaturated fatty acids with styrene as a dienophilic reactant.

(2) Substitutive diene synthesis of mono-unsaturated and non-conjugated unsaturated fatty acids with styrene.

(3) Addition of styrene to unsaturated fatty acids with formation of polystyrene side-chains.

In addition, a varying amount of oligomers and/or polymers of styrene are formed which are restrictedly soluble in the reaction products and are thus not directly precipitated. Only when these polymers constitute a major proportion of the product does precipitation occur which renders the products undesirably turbid.

The possibility of an alternating copolymerisation of fatty acids with styrene has been postulated by various researchers, but so far no well founded experimental results have become available that would prove this mechanism to be the main reaction. Nor is this surprising, since the reactions referred to above occur in the hitherto practised styrolisation processes simultaneously and concurrently, and the copolymers in the form in which they have so far been obtained always consist of a mixture of structurally widely differing substances; while the composition of the said mixtures can be varied to a certain extent by using different starting materials and reaction conditions, this typical structural principle cannot be basically modified.

It was all the more surprising to observe that it is possible to influence the styrolisation process in the case of conjugated-unsaturated fatty acids—referred to hereinafter as "conjoint-fatty acids"—and their derivatives by maintaining certain reaction conditions in a manner such that as a result of additive and disproportionation reactions co-oligomers are formed that constitute polycarboxylic acids of higher molecular weight, predominantly dicarboxylic acids and derivatives thereof. This unexpected observation and the essential reaction conditions to be maintained form the subject of the present invention.

According to the invention conjoint-fatty acids and their derivatives, especially their esters with monohydric alcohols of 1 to 4 carbon atoms, or mixtures containing them, are subject to ionic copolymerisation with aromatic vinyl compounds, primarily styrene or its homologues, in the ratio of 0.1 to 5 mols, preferably 0.5 to 2 mols, of aromatic vinyl compound per mol of conjoint-fatty acid preferably in the presence of an inert solvent, at a temperature not exceeding 200° C., preferably at 50° to 150° C., whereupon constituents of low molecular weight, such as unreacted fatty acids (or derivatives thereof), unreacted styrene (or homologues thereof), vinylated monocarboxylic acids (or their derivatives) and solvents if present, may be removed, usually by distillation.

The products of the present process are unsaturated compounds and consist substantially wholly or partially of polybasic aryl aliphatic acids. Their general structural principle is based on at least 2 molecules of conjoint-fatty acid being linked together through one or more molecules of the aromatic vinyl compound. Their main carbon chains end in each case in a carboxyl group, while the aromatic groups as well as alkyl or alkylene radicals are present as side chains, this being an essential difference from the hitherto known styrolised fatty acids.

The starting materials used in the manufacture of araliphatic polycarboxylic acids according to the present process may be conjoint-fatty acids of all kinds and their derivatives, such as eleostearic acid, licanic acid, dehydrogenated castor oil fatty acid, isomerised linoleic acid, isomerised linolenic acid, isomerised poly-ene fatty acids of the oils from marine animals, and mixtures of these with saturated and nonconjugated unsaturated fatty acids. Particularly suitable are their esters with mono-hydric alcohols having 1 to 4 carbon atoms in the molecule preferably their methyl esters, because with their esters the removal by distillation of any ester portion that has escaped polymerisation can be effected under mild conditions. Likewise suitable are the esters prepared by alcoholysis into esters of monohydric alcohols with 1 to 4 carbon atoms, preferably into the methyl esters of fats and oils containing the aforementioned fatty acids in a combined form, such as wood oil, oiticica oil, dehydrogenated castor oil, also isomerised oils such as soybean oil, cotton seed oil, sunflower oil, safflower oil, corn oil, linseed oil, perilla oil and oils from marine animals.

As copolymerisable compounds there are primarily used styrene and its homologues, such as alpha-methylstyrene or vinyltoluene, if desired in the form of a mixture of both. As catalysts known to be suitable for this purpose there may be mentioned substances acting as proton donors, for example strong mineral acids such as sulphuric, hydrochloric and hydrofluoric acid (which are advantageously deposited on a carrier), also sulphonic acids such as toluenesulphonic acid, or cation exchangers in the acid form, Friedel-Crafts catalysts such as aluminum chloride, tin tetrachloride or the like, and complex boronfluoride acids, for example borofluoride acetic acid. On the other hand, catalysts which trigger off a free radical copolymerisation such as peroxides, redox systems and the like are not suitable. It is of advantage to add to the batch a stabiliser that reliably inhibits free radical copolymerisation, such, for example, as hydroquinone or butyl pyrocatechol.

Of special significance are the duration and temperature of the process since, as these are increased, undesirable reaction products may be formed on an increasing scale. These are primarily monobasic acids formed by Diels-Alder addition and graft polymerisation. In addition, as is known, the formation of oligomeric and polymeric styrene may become important above about 180° C. It is therefore preferred to raise the temperature of the batch gradually until, within the temperature range of about 50° to 120° C., depending on the starting material, the catalyst and the proportions used, copolymerisation sets in, as frequently shown by a spontaneous rise in temperature. When this occurs the reaction mixture is cooled immediately, for as long and as strongly as is needed to keep its temperature within the range 80° to 150° C. When the temperature begins to drop appreciably the batch is heated to about 180° C. to complete the reaction. In many cases however—more especially when the ratio of vinyl compound to conjoint-fatty acid is low—the exothermic character of the reaction is not so marked. Under such conditions the reaction mixture can be kept for several hours at 100° to 150° C. and then heated for a relatively short time only to about 180° C.

It is easy to follow the progress of the reaction by observing the change in the viscosity of the batch, which at first increases steadily, until a maximum value is reached where it remains constant.

The yield of polycarboxylic acids, and also their composition, depend, apart from the influences mentioned above, substantially on the molecular ratio in which the reactants are used. Good yields of polycarboxylic acids with a high content of dicarboxylic acids are obtained by reacting about 0.5 to 2 mols of vinyl compound with 1 mol of conjoint-fatty acid, account being taken of the fact that the vinyl compound reacts substantially quantitatively.

Saturated fatty acids do not participate in the copolymerisation under the conditions of the present process, while mono-unsaturated and unconjugated unsaturated fatty acids participate in it only to a minor extent. The unreacted material as well as any styrolised carboxylic acids of low molecular weight, and also solvents, if present, can be removed by distillation under atmospheric pressure, after which the high-boiling fatty acid or ester is distilled under reduced pressure.

The products obtained by the present process are liquids of different viscosities and do not crystallise. Depending on the nature of the starting material their colour ranges from almost water-clear to yellowish. They are characterised by the acid number, the saponification number and the equivalent weight calculated therefrom. The methyl esters of the polycarboxylic acids can be distilled under vacuum without decomposition so that their behavior at the boil allows deductions to be made as to the kind and proportion of the polycarboxylic acids formed. With the aid of thin-layer chromatography the polybasic acids and their derivatives are easy to differentiate from other constituents of the products. Their structure as polybasic acids is further shown by reaction with polyfunctional compounds, for example with polyamines and polyalcohols, whereby macromolecular compounds are formed.

The essential advance in the art provided by the invention is to make it possible to manufacture in an industrially simple manner and from inexpensive starting materials polycarboxylic acids of high molecular weight, especially dicarboxylic acids, and their derivatives, which in spite of their unsaturated nature display a remarkable stability towards oxidation and elevated temperatures. By virtue of their araliphatic structure both the acids themselves and their derivatives are remarkably compatible with a wide variety of substances. This property is of special value to their use in the field of plastics.

The products are by virtue of their polyfunctional properties valuable starting materials for the manufacture of thermoplastic resins, infusable plastics, elastomers and the like, such as lacquer resins, foils, coatings, sealing compounds and adhesives and the like. Above all their reaction products with other polyfunctional substances, for example with polyalcohols or polyamines, offer many possibilities in the manufacture of novel products or for the improvement of known products.

The following examples illustrate the invention.

Example 1

The reaction vessel used was a closed cylindrical reactor of stainless steel which was equipped with the usual fittings and additionally with an agitator, heating and cooling coils and a distillation head with reflux condenser and descending condenser. At the inlet to the reactor there was provided an evacuating device for performing distillations under a vacuum down to 0.5 mm. Hg. To measure the temperature of the batch and the steam chamber use was made of a recording measuring instrument composed of several electric resistance thermometers and thermocouples. A gas inlet union was further provided to enable working in an inert gas.

As co-monomers there were used soybean oil fatty acid methyl ester containing 55 to 60% of conjoint-fatty acid methyl ester (saponification number 192) and styrene stabilised with 0.1% of butyl-pyrocatechol. As catalysts there was used a bleaching earth activated with hydrochloric acid, which after drying under vacuum contained 2.2% of titrable acid (calculated as hydrochloric acid) and 0.2% of water. In the experiments described below the ratio of styrene to fatty acid methyl ester (or conjoint-fatty acid methyl ester) was varied, while in each case 1% of bleaching earth (calculated on the total batch in each case) was used as catalyst. In general, the total amounts of co-monomers were used from the start and reacted; only in the case of high proportions of styrene (over 50% of the total weight of the batch) was approximately half the styrene present at the start, while the remainder was added gradually after copolymerisation had set in.

What decides substantially the success of the copolymerisation in the desired direction is the control of the temperature during the process. The reaction mixture was maintained within the range of 70 to 150° C. until the viscosity of the specimens tested remained constant; only thereafter was the batch heated to 180° C., kept for about 1 hour at this temperature, and then cooled to about 80° C. While in experiments with small proportions of styrene the onset of the reaction was not clearly obvious, there was observed in the presence of about 20% by weight of styrene (calculated on the total weight of the batch) in the range from 70° to 120° C. a sudden temperature surge, whereupon the heating was immediately reduced and, if necessary, the batch was cooled to enable its temperature to be maintained within the limits mentioned above. When the main reaction has subsided, the reaction mixture was heated for about 1 hour longer at 180° C. This time taken by the reaction of the individual batches amounted to a total of about 4 to 6 hours.

The catalyst was filtered off and the volatile constituents were distilled off under a pressure of 0.6 mm. Hg by raising the temperature in the still to 260° C. and maintaining it at this level until no more distillate passed over. The temperaure in the distillation head rose during this time to about 210° to 220° C. The further details of the experiments and the properties of the products obtained are listed in Table 1.

monomers (1 mol of vinyl compound per mol of conjoint-fatty acid methyl ester), assuming that in each case 2 molecules of conjoint-fatty acid methyl ester undergo copolymerisation with 2 molecules of the vinyl compound to form the dicarboxylic acid ester.

A comparable experiment performed under identical

TABLE 1

| Experiment No. | Isomerised soybean oil fatty acid methyl ester | | Styrene, kg. | Mol styrene per mol conjoints | Distillation | | Residue equivalent weight | Distillate | | Equivalent weight |
|---|---|---|---|---|---|---|---|---|---|---|
| | Percent conjoints | kg. | | | Percent | Sapon. No. | | Percent | Sapon. No. | |
| 1 | 60 | 360 | 18.7 | 0.1 | 57.3 | 174.4 | 321 | 42.7 | 186 | 301 |
| 2 | 56 | 330 | 28.6 | 0.4 | 58.3 | 169.3 | 330 | 41.7 | 184.7 | 304 |
| 3 | 56 | 330 | 57.2 | 0.9 | 63.2 | 148.4 | 378 | 36.8 | 176.2 | 318 |
| 4 | 56 | 195 | 67.2 | 1.79 | 67.1 | 135 | 415 | 32.9 | 161 | 349 |
| 5 | 56 | 180 | 125 | 3.57 | 65.4 | 97.6 | 574 | 34.6 | 135 | 416 |
| 6 | 60 | 180 | 156 | 4.17 | 75.5 | 93 | 603 | 24.5 | 138.3 | 406 |
| 7 | 60 | 132 | 228 | 8.35 | 75.8 | 70.5 | 795 | 24.2 | 124.5 | 449 |

As will be seen from the analytical data the distillation residue consists predominantly of high molecular weight carboxylic acid methyl esters, while the distillate consists predominantly of fatty acid methyl esters and to a minor extent of styrolised fatty acid methyl esters. By thin-layer chromatography (on silica gel/gypsum, using ether as the eluant) the distillation residue of experiment 3 was identified as the substantially pure dicarboxylic acid ester, while the residues from experiments 2 and 4 consisted predominantly of dicarboxylic acid esters admixed with minor amounts of unidentifiable byproducts. The residue from experiment 1 contained in addition to these styrolised dicarboxylic acid esters also dimeric fatty acid esters. The residues from experiments 4 to 6 were identified as mixtures of esters of dicarboxylic and tricarboxylic acids contaminated with major proportions of unidentifiable by-products. Identical results were obtained by short-way distillation of the different residues under a pressure of 0.05 mm. Hg. Within the range 200° to 340° C. (measured as the sump temperature) the residues from experiments 1 to 4 could be distilled substantially quantitatively and those from residues 5 to 7 to an extent of about 80%.

conditions, but without using a catalyst, gave a yield of only 22% of non-volatile copolymers in which it was possible to identify likewise dicarboxylic acid esters, though these were mixed with large amounts of unidentifiable by-products.

*Example 3*

A glass apparatus of about 1.5 litre capacity, so equipped as to allow the conditions described in Example 1 to be maintained, was charged in each case with equal amounts of wood oil fatty acid methyl ester (saponification number 195, containing 78% of conjoint-fatty acid methyl ester) which was then copolymerised as described in Example 1 with varying amounts of the vinyl compounds and in each case 0.3% of tin tetrachloride as catalyst, calculated from the total weight of the batch. In the experiment using the highest proportion of the vinyl compound reaction set in already at 80° C. The reaction times needed were likewise considerably shorter than in the experiments of Example 1 and amounted in each case to a total of 3 to 4 hours. Table 2 lists the details and results of this series of experiments.

TABLE 2

| Experiment No. | Wood oil fatty acid methyl ester, g. | Vinyl compound, g. | Distillation residue | | | Distillate | |
|---|---|---|---|---|---|---|---|
| | | | Percent | Sapon. No. | Equivalent weight | Percent | Sapon. No. |
| 1 | 600 | 54 Vinyltoluol | 23 | 168.4 | 331 | 73 | 188 |
| 2 | 600 | 104 Styrol | 47 | 159.8 | 350 | 53 | 187 |
| 3 | 600 | 208 Styrol | 58 | 161.2 | 347 | 42 | 162 |
| 4 | 600 | 520 Styrol | 65 | 136 | 412 | 35 | 108 |

*Example 2*

290 kg. of isomerised suflower oil fatty acid methyl ester (saponification number 193.6, containing 61% of conjoint-fatty acid methyl ester), 50 kg. of styrene and 15 kg. of alpha-methylstyrene were dissolved in 100 kg. of toluene, mixed with 30 kg. of acid-activated bleaching earth and refluxed for 6 hours under the same conditions as in Example 1. During this operation the viscosity of the mixture at first increased continuously, and after a total of 5 hours' heating reached a value which remained substantially constant when the mixture was heated for 1 hour longer. After cooling, the bleaching earth was filtered off and the solvent was distilled off under atmospheric pressure, whereupon the volatile sump constituents were expelled under 0.5 mm. Hg pressure at a temperature up to 260° C. The residue (230 kg.) was a light-yellow, thinly liquid substance, corresponding to a yield of about 65%. The saponification number was 142 and the equivalent weight calculated from it was 395. These values were in keeping with the theoretical values which are calculated from the initial molecular ratio of the co- As revealed by the yields and analytical data of the distillation residues, experiments 2 and 3 produced the best results. The copolymer obtained in these experiments was non-volatile under the processing conditions employed; it consisted almost completely of dicarboxylic acid ester. In experiment 4, on the other hand, the dicarboxylic acid obtained was admixed with tricarboxylic acid ester and unidentifiable by-products.

*Example 4*

600 g. of dehydrogenated castor oil fatty acid were copolymerised with 120 g. of vinyltoluene, in the presence of 10 g. of acid-activated bleaching earth, as described in Example 1 in the apparatus used in Example 3. The bleaching earth was then filtered off and the reaction mixture subjected to distillative processing, to furnish 410 g. of a light-yellow, liquid residue, corresponding to a yield of 58.6%. The distillation residue had an acid number of 142, corresponding to an equivalent weight of 394. The acid number of the distillate was 175.

Example 5

600 g. of isomerised soybean oil fatty acid methy ester (acid-free; 56% of conjoint-fatty acid methyl ester), 104 g. of styrene and 3.5 g. of borofluoride monoacetic acid were reacted in the apparatus described in Example 3. The reaction started appreciably already at room temperature as shown by a gradual increase in the temperature of the mixture. The batch was gradually heated to about 120° C. and maintained at this temperature until its viscosity remained substantially constant; this took about 2 hours. The reaction mixture was then heated for another hour at 180° C. then cooled and mixed with 20 ml. of water, and the catalyst was removed under vacuum while sucking carbon dioxide through. The subsequent working up by distillation, performed under the conditions described in the preceding examples, gave a yield of 405 g. of the light-yellow, liquid residue, corresponding to a yield of 57.5% of the theoretical. The saponification number of the residue was 148, corresponding to an equivalent weight of 379. The saponification number of the distillate was 181.

Examination of the distillation residue by thin-layer chromatography (silica gel/gypsum; eluant: ether) revealed the main product to be dicarboxylic acid methyl ester, admixed with minor proportions of tricarboxylic acid esters and unidentifiable by-products.

We claim:

1. The process for the manufacture of polybasic araliphatic carboxylic compounds which include subjecting a conjugated unsaturated fatty acid compound selected from the class of conjugated unsaturated fatty acid and $C_1$ to $C_4$ alkanol esters of the said acids to ionic copolymerisation with an aromatic vinyl compound selected from the class consisting of styrene, alpha methyl styrene, and vinyl toluene in the proportions of 1 mol of fatty acid compound to 0.2–5 mols of aromatic vinyl compound and controlling the temperature of the reacting mass to prevent the mass temperature from exceeding at any time a temperature of about 200° C., subsequently removing volatile products of the reaction by distilling the mass at atmospheric pressure, and recovering the product.

2. A polybasic araliphatic carboxylic compound obtained by the process of claim 1.

3. A product according to claim 2 wherein the aromatic vinyl compound is styrene.

4. A product according to claim 2 wherein the aromatic vinyl compound is alpha-methyl styrene.

5. Process according to claim 1 where the conjugated unsaturated fatty acids are esterified with monohydric alcohols containing 1–4 carbon atoms and the said esters are copolymerised with the aromatic vinyl compounds.

6. The process according to claim 1 wherein the copolymerization of the conjugated unsaturated fatty acid compound is effected in the presence of a fatty acid having but one unsaturated linkage.

7. The process according to claim 1, wherein the copolymerization is effected in the presence of xylene.

8. Process according to claim 1 wherein the molar ratio of the said aromatic vinyl compound to conjugated unsaturated fatty acid compound is between 0.5:1 and 2:1.

9. Process according to claim 1 wherein the polymerization step is conducted in two stages, the first stage being conducted at a temperature of between 50 and 150° C., and the final stage being conducted at approximately 180° C.

10. Process according to claim 1 wherein the copolymerization of the conjugated unsaturated fatty acid compound is effected in the presence of a straight chain fatty acid.

11. Process according to claim 1 wherein the copolymerization of the conjugated unsaturated fatty acid compound is effected in the presence of a $C_1$ to $C_4$ alkanol ester of a straight chain fatty acid.

12. Process according to claim 1 wherein the copolymerization is effected in the presence of a catalyst which is acid activated bleaching earth.

13. Process according to claim 1 wherein the copolymerization is effected in the presence of toluene.

14. Process according to claim 1 wherein the copolymerization is effected in the presence of an inhibitor of free radical-initiated polymerization selected from the group consisting of hydroquinone and butyl pyrocatechol.

15. Process according to claim 1 wherein, when the copolymerization has been substantially completed, any unreacted fatty acids and derivatives of fatty acids, unreacted aromatic vinyl compounds, vinylated monocarboxylic acid, derivatives thereof and solvents contained in the product are removed by distillation.

16. A process for the manufacture of polybasic araliphatic carboxylic compounds which includes subjecting a conjugated unsaturated fatty acid compound selected from the class of conjugated unsaturated fatty acids and $C_1$ to $C_4$ alkanol esters of the said acids to ionic copolymerisation with an aromatic vinyl compound selected from the class consisting of styrene and homologues of styrene in the proportions of 1 mol of fatty acid compound to 0.2–5 mols of aromatic vinyl compound and controlling the temperature of the reacting mass to prevent the mass temperature from exceeding at any time a temperature of about 200° C., subsequently removing volatile products of the reaction by distilling the mass at atmospheric pressure, and recovering the product.

References Cited by the Examiner

UNITED STATES PATENTS

| | | |
|---|---|---|
| 2,190,915 | 2/1940 | Bass et al. |
| 2,395,504 | 2/1946 | Rubens et al. _____ 260—23 |

FOREIGN PATENTS

| | | |
|---|---|---|
| 769,439 | 3/1957 | Great Britain. |

OTHER REFERENCES

Bhow et al., Industrial and Engineering Chemistry, vol. 42, No. 4, pp. 700 to 703.

Powers, Industrial and Engineering Chemistry, vol. 42, No. 10, pp. 2096 to 2099.

CHARLES B. PARKER, *Primary Examiner.*

ANTON H. SUTTO, *Assistant Examiner.*